United States Patent [19]

Oho et al.

[11] Patent Number: 4,554,461

[45] Date of Patent: Nov. 19, 1985

[54] INFORMATION TRANSMITTING APPARATUS

[75] Inventors: Shigeru Oho, Hitachi; Fumio Hamano, Katsuta; Takeshi Hirayama, Mito, all of Japan

[73] Assignee: Hitachi, Ltd., Tokyo, Japan

[21] Appl. No.: 564,492

[22] Filed: Dec. 22, 1983

[30] Foreign Application Priority Data

Dec. 24, 1982 [JP] Japan .................................. 57-225899

[51] Int. Cl.[4] .............................................. H02G 3/00
[52] U.S. Cl. .................................... 307/40; 307/10 R; 307/41; 371/22; 371/67
[58] Field of Search ................... 307/10 R, 38, 40, 41; 340/825.52, 825.53; 371/22, 67

[56] References Cited

U.S. PATENT DOCUMENTS

| | | | |
|---|---|---|---|
| 3,648,052 | 3/1972 | Sognafast et al. | 307/10 R |
| 3,819,949 | 6/1974 | Ueda et al. | 307/10 R |
| 4,118,638 | 10/1978 | Huwyler | 307/10 R X |
| 4,227,181 | 10/1980 | Brittain | 307/10 R X |
| 4,302,841 | 11/1981 | McCulloch | 307/10 R X |

FOREIGN PATENT DOCUMENTS 85973 8/1983 European Pat. Off. .

Primary Examiner—Reinhard J. Eisenzopf
Assistant Examiner—Derek S. Jennings
Attorney, Agent, or Firm—Antonelli, Terry & Wands

[57] ABSTRACT

An information transmitting apparatus includes a transmitting apparatus for transmitting control information; a receiving apparatus for receiving the control information; a transmission line provided between the transmitting apparatus and the receiving apparatus; and a load which operates in response to the output of the receiving apparatus; wherein the transmitting apparatus transmits the control information through the transmission line to the receiving apparatus within a given time period and the receiving apparatus makes the load operative on the basis of the control information received. The receiving apparatus has a circuit for detecting the reception interval of the transmission information from the transmission line and for generating an abnormality signal when that interval becomes a predetermined time or more.

8 Claims, 9 Drawing Figures

INFORMATION TRANSMITTING APPARATUS

BACKGROUND OF THE INVENTION

The present invention relates to an information transmitting apparatus for transmitting control information to terminal processors which control and observe a plurality of loads and, more particularly, to an information transmitting apparatus which is suitable for use in information transmission in the compartment of a motor vehicle and the like.

As an information transmitting apparatus for motor vehicles, a fundamental system is disclosed in U.S. Pat. No. 3,648,057. An information transmitting system is also shown in SAE PAPER 810174. As shown in these literatures, the information transmission in the compartment of a motor vehicle will be increasingly needed in the future.

For example, a number of electrical power operated devices such as various lamps, motors, etc., and a number of various kinds of sensors and the like (hereinbelow, referred to as loads) are arranged in a motor vehicle, and the number of those devices increases more and more in association with the electronization of motor vehicles. Due to this, the wirings and connections for transmitting control signals to the electrical devices and signals from the sensors and the like are extremely complicated and the number of them is very large, causing a large problem. As a method of solving this, a transmitting method has been proposed whereby a number of signals are transmitted by a single signal line. According to such a method, since a transmission line is commonly used, if an abnormal state such as disconnection or the like occurs in the transmission line, the whole transmission system would have lost its function. In this case, there is a fear of malfunction of each device (load) to be controlled by the transmission system, so that this is very dangerous.

It is therefore desirable that the terminal processors in the transmission system of motor vehicles have a circuit for detecting the abnormality of the signal transmission lines and fail safe means for determining the operations of the loads into the safe states if necessary.

One transmission system having fail safe means is disclosed in Japanese Patent Kokai (Laid-Open) No. 105490/80. However, the fail safe system disclosed in this Gazette is not a system which can be integrated.

SUMMARY OF THE INVENTION

It is an object of the present invention to provide an information transmitting apparatus suitable for the integration which can detect the abnormality of the information transmitting function.

The abnormality of the information transmitting function occurs due to, for example, disconnections of the transmission lines and failures of the circuits relating to the information transmitting operations.

A feature of the present invention is that there is provided a circuit, e.g., a digital timer to detect that the intervals of the transmitting operations to be performed through the transmission lines are longer than predetermined values, thereby to detect the abnormality of the transmitting operations.

BRIEF DESCRIPTION OF THE DRAWINGS

The above and other objects, features and advantages of the present invention will be more clear from the following description with reference to the accompanying drawings, in which.

DESCRIPTION OF THE PREFERRED EMBODIMENT

Figure 1:
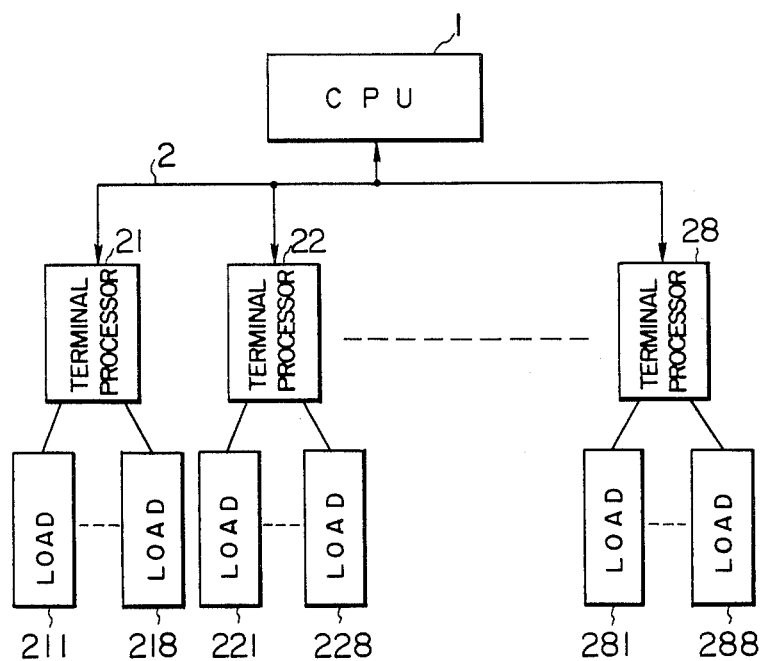
FIG. 1 is a schematic constitutional diagram showing an embodiment of terminal processors according to the present invention.

FIG. 1 is a schematic constitutional diagram showing one embodiment of terminal processors according to the present invention. A central processing unit (hereinbelow, referred to as a CPU) 1 performs the transmission of signals to and the reception of the same from a plurality of terminal processors 21-28 through a signal transmission line 2. Addresses have been assigned to the respective terminal processors 21-28. These terminal processors 21-28 are distributed and disposed in each portion in a motor vehicle and control driving devices, display devices, or sensor devices (hereinafter, referred to as loads) 211-288 in response to signals from the CPU 1. At the same time the terminal processors 21-28 transmit the output signals of some of the loads 211-288 to the CPU 1. The transmission of the output signals to the CPU 1 is not done until the terminal processors 21-28 receive the signals from the CPU 1. In addition, each of the terminal processors 21-28 is surely accessed by the CPU 1 within a preset time. Therefore, if the signals transmitted from the CPU 1 are being observed by the terminal processors 21-28, when an abnormality, such as a disconnection or the like of the transmission line 2 has occurred, such abnormality can be detected.

The fundamental operations and fundamental circuit with respect to the transmitting and receiving operations of the information system of FIG. 1 are disclosed in Japanese Patent Application No. 17535/82 corresponding to U.S. application Ser. No. 464,212, Canadian Patent Application No. 421,069 and European Patent Application No. 83101134.1 each filed on Feb. 7, 1983 and assigned to the same assignee as the present application.

Figure 2:
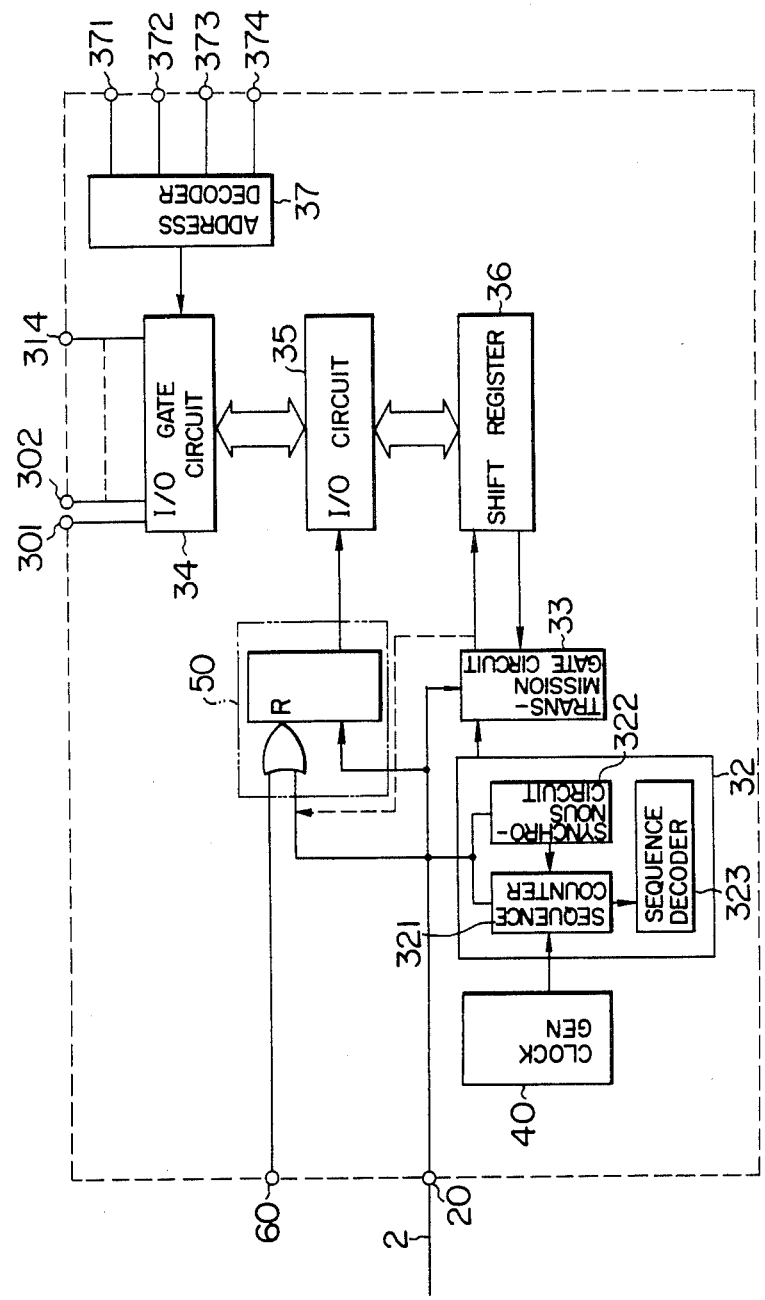
FIG. 2 is a circuit block diagram showing one embodiment of those terminal processors.

FIG. 2 is a circuit block diagram showing one embodiment of the above-mentioned terminal processors 21-28. In FIG. 2, the addresses assigned to each terminal processor are given to address terminals 371-374 and are decoded by an address decoder 37 and its output controls an input-output gate circuit 34. Among the input-output terminals 301-314, the terminals of the number indicated by the addresses from the terminal 301 are used as the output terminals, while the remaining terminals are used as the input terminals. The signal from the CPU 1 passes through the transmission line 2 and a terminal 20 of the terminal processor and is sent to a control circuit 32 for determining the operation of the whole terminal processor and to a transmission gate circuit 33 for performing the transmission and reception of the signal. The control circuit 32 comprises a sequence counter 321, a synchronous circuit 322 and a sequence decoder 323. The sequence counter 321 serves to count the basic clocks of the terminal processor received from a clock generator 40. The sequence decoder 323 serves to output a control signal in response to the value of the sequence counter 321. The synchronous circuit 322 serves to preset the sequence counter 321 synchronously with the signal received by the terminal processor. The details of these circuits are shown in FIG. 2 of the Japanese Patent Application No. 17535/82.

Figure 3:
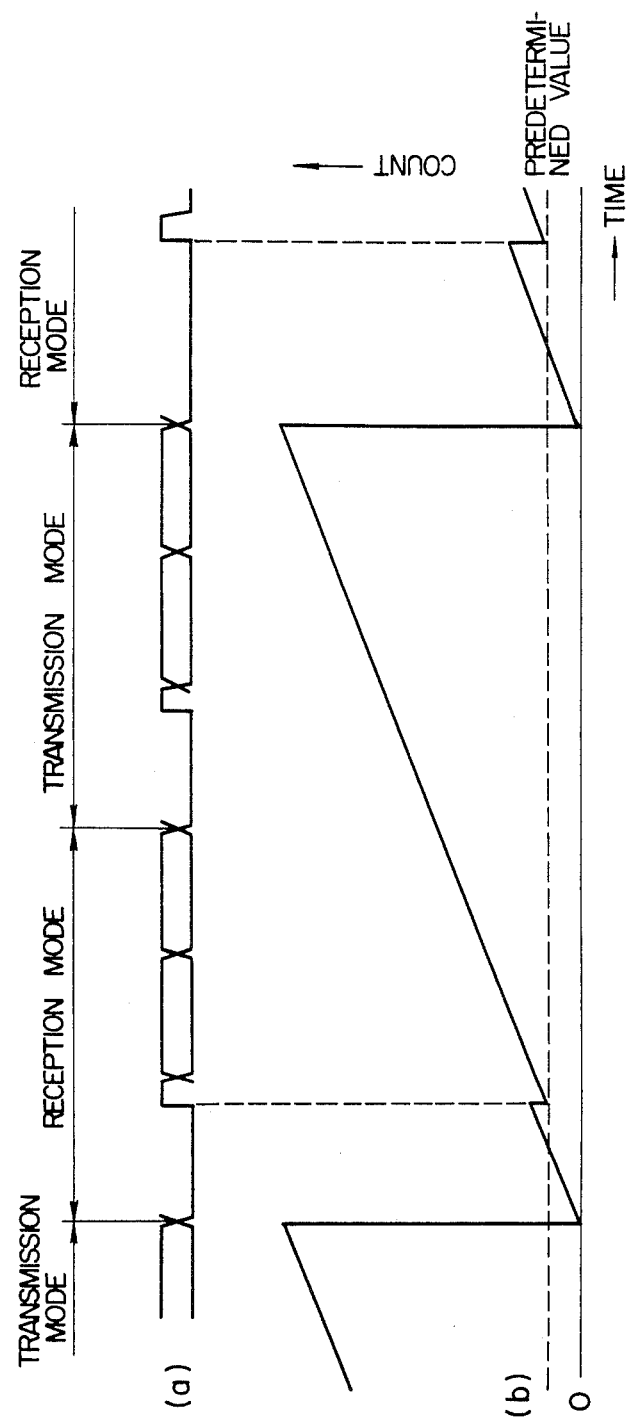
FIG. 3 is a diagram showing an embodiment of a control sequence of the terminal processors.

FIGS. 3(a) and 3(b) are diagrams showing the sequence of the control. FIG. 3(a) shows the waveforms of the signal which the terminal processor transmits and receives and FIG. 3(b) shows the state of the sequence counter 321 corresponding to FIG. 3(a). When the transmission gate circuit 33 operates in the reception mode and the terminal processor receives the signal, the sequence counter 321 is preset and the receiving operation is started.

The above-mentioned transmission gate circuit 33 is a gate circuit for performing the transmitting and receiving operations of the signals between a shift register 36 and the transmission line 2 and corresponds to the AND gates AND1–AND3 and NOR gate NOR1 of FIG. 2 of the Japanese Patent Appln. No. 17535/82. The signals are transmitted and received between the shift register 36 and an input-output circuit 35 and, furthermore, the signals are transmitted and received between the input-output circuit 35 and the input-output gate circuit 34.

These circuits are also described in the Japanese Patent Appln. No. 17535/82.

In the block diagram of FIG. 2, it is a fail safe circuit 50 that directly relates to the accomplishment of the object of the present invention. The signal transmitted to the terminal 20 is sent to the control circuit 32 and transmission gate circuit 33 and is also input to the fail safe circuit 50 for detecting the abnormality of the transmitting function. In the case where the fail safe circuit 50 determines that the fail safe operation is needed, it controls the input-output circuit 35 to determine the operation of the load. This state is referred to as a fail safe mode. A reference numeral 60 denotes a reset terminal to be used for cancelling the fail safe mode or the like. This fail safe circuit 50 has a function to monitor the interval of the transmitting operation which is performed through the transmission line 2. In the case where the next information transmission is not performed even when a constant time period has passed after the signal transmission had been executed or in spite of the fact that the operation of the transmission system had been started, the signal indicative of the abnormality of the transmission system is output. The backup operation is performed if necessary. To check the execution of the information transmission, the actual signal on the transmission line 2 may be monitored or the receiving and transmitting operations may be monitored.

Figure 4:
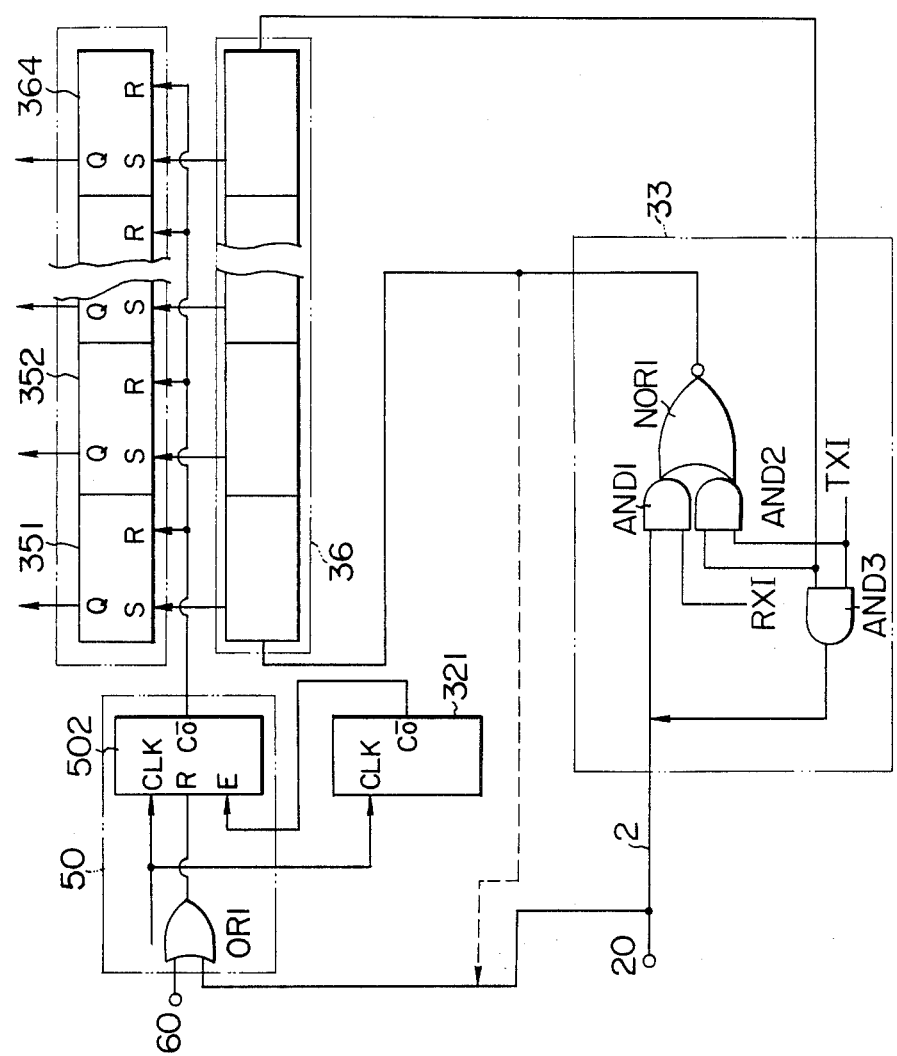
FIG. 4 is a circuit block diagram showing one embodiment of a fail safe circuit of the terminal processors.

FIG. 4 shows a constitutional diagram of the fail safe circuit 50, in which the input-output circuit 35 is constituted by flip flops 351–364 and each of these flip flops 351–364 is equipped with a set terminal and a reset terminal, respectively. The signal from the terminal 20 is connected to the reset terminal of a timer counter 502. This timer counter 502 is equipped with an enable terminal and a carry-out terminal. As described before, the terminal processor has the sequence counter 321 for the sequential control. This sequence counter 321 and the timer counter 502 are cascade connected. Namely, the clock terminal of the timer counter 502 is connected to the clock generator 40 of the terminal processor, while the enable terminal is connected to the carry-out terminal of the sequence counter 321. This counter 321 corresponds to the counter 52 of the Japanese Patent Appln. No. 17535/82. In the normal case, the terminal processor is certainly accessed by the CPU 1 within a predetermined time. In the case where it is not accessed within this time, the timer counter 502 outputs a high-level signal to the carry-out terminal. Therefore, since the carry-out terminal is connected to each reset terminal of the above-mentioned flip flops 351–364, the timer counter 502 is returned to its initial value in the normal state whenever the terminal processor is accessed. In this embodiment, the timer counter 502 is reset and the output does not become high level. On the other hand, since the timer counter 502 is not reset at the abnormal time, the carry-out terminal of the timer counter 502 becomes high level after a predetermined time period, thereby allowing the flip flops 351–364 to be cleared.

In other words, the timer 502 detects the information transmission interval of the transmission line 2 and outputs the signal representing the abnormality from the terminal CO when this interval becomes a predetermined value or more. Preset values are set into the registers 351–364 for the backup by this signal; in this embodiment, they are reset. The outputs of the registers 351–364 become "low" level in this reset state, so that a "low" level signal is applied to each load. Each load is connected in the manner such that it becomes the fail safe state in response to the "low" level output signals of the registers 351–364. For example, in the case where the load is a winker module, it is connected so that the winker module is turned off. In the case where the load is the washer liquid spraying device module, it is connected such that its operation stops. In the case where the load is a motor module for opening and closing a window glass or the like, it operates so as to stop this motor.

In the embodiment of FIG. 4, the timer 502 is also reset by the noise on the transmission line 2. If the transmission line is disconnected, the noise will not be input, therefore, the fundamental function of this apparatus can be satisfactorily provided. However, in order to realize the apparatus which can cope with a slightly larger noise, it is constituted in such a manner that the output of the gate circuit 33 is input to the OR gate OR1 as indicated by the broken line instead of directly inputting the signal from the terminal 20 to the OR gate OR1. The practical operation of this gate circuit 33 is described in detail in the Japanese Patent Appln. No. 17535/82. Since the AND gate AND1 in this gate circuit 33 is made operative only in the reception mode of the information, the output of the NOR gate NOR1 is output correctly in response to the information to be transmitted by the transmission line 2, this enables the timer 502 to relatively and correctly detect the information transmitting operation using the transmission line 2.

Although the fail safe circuit in the embodiment of FIG. 4 is provided for each of the terminal processors 21–28 of FIG. 1, each of the fail safe circuits 50 of the respective terminal processor responds to all the transmission information without detecting the information of the address responsive to each terminal processor.

Therefore, in FIG. 1, even if only the CPU 1 and terminal processor 21 perform the transmitting operations and the other terminal processors 22-28 do not perform data transmission at all, each fail safe circuit of the terminal processors 22-28 determines that the transmission system is normal and does not output the abnormality signal. In this embodiment, if the central processing unit performs the transmitting operation to either of the terminal processors within a constant time, the transmission system will be discriminated to be normal; therefore, this allows the operation of the CPU 1 to be simplified.

The terminal 60 of FIG. 4 is provided to stop the function of the fail safe circuit 50. In other words, in case of the test operation and the like, the fail safe circuit 50 can be maintained in the stop state by inputting the "high" level signal to the terminal 60.

In the embodiment of FIG. 4, all of the outputs of the register 35 have been set into the "low" level for the purpose of backup. However, some of them may need the "high" level in dependence upon the characteristic of the load. Therefore, it is desirable that it is possible to select whether the output of the register 35 becomes "low" level or "high" level in the backup mode. Such a circuit arrangement is shown in FIG. 5.

Figure 5:
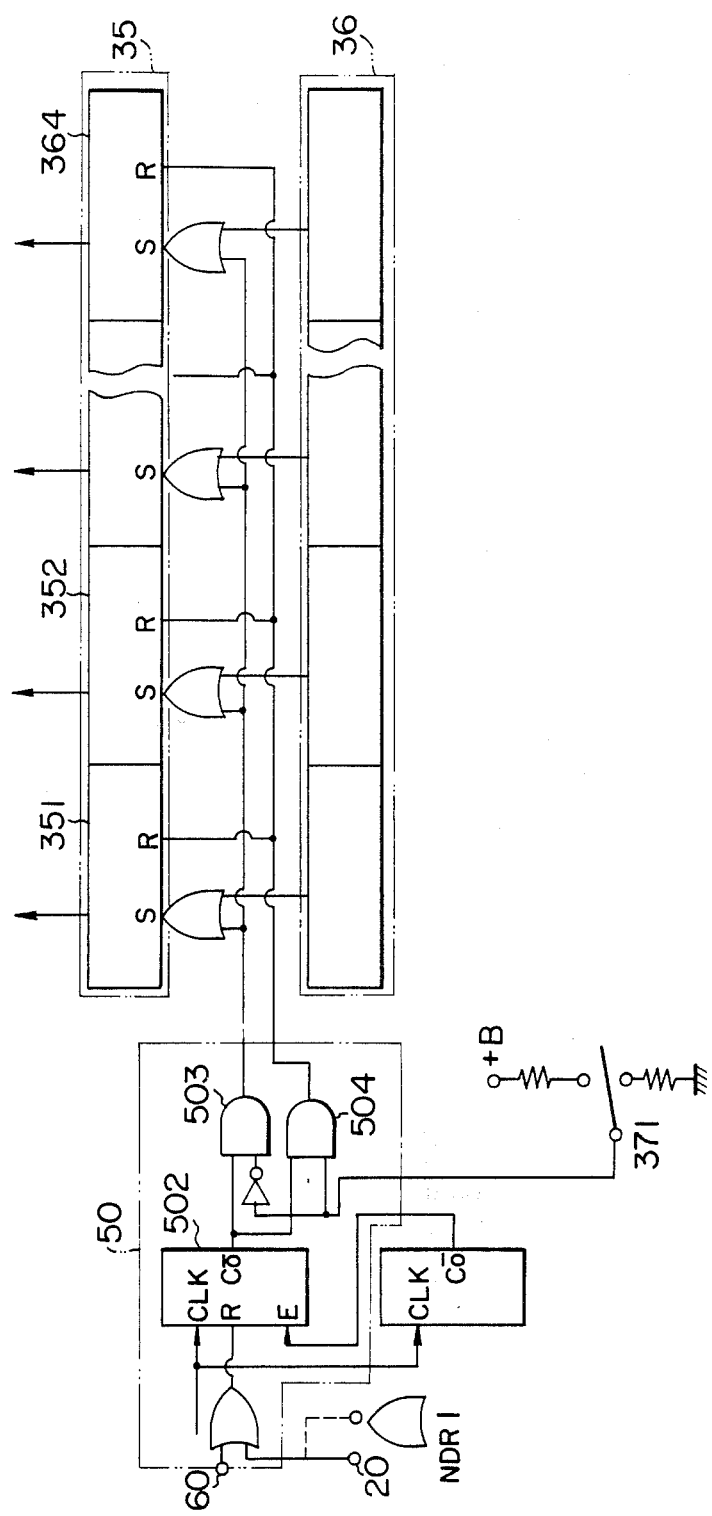
FIGS. 5 and 6 are circuit block diagrams showing other embodiments of the above-mentioned fail safe circuit, respectively.

FIG. 5 is a circuit diagram showing another embodiment having such a function as mentioned above of the fail safe circuit 50. This embodiment utilizes the addresses assigned to the terminal processors for determining the operation of the load in the fail safe mode. Namely, when the address, is an even number (odd, number), the signal is set into the high level; while in the case of an odd number (even number), it is set into the low level. It is possible to easily check the difference between the even and odd numbers of the address by discriminating the level at the least significant bit terminal of the address terminals 371-374 in FIG. 2 to determine whether it is high or low. In FIG. 5, in case of the even-number address, each input to an AND gate 503 is the output "1" of the timer counter 502 and the inverter output "1" of the value "0" of the address least significant bit terminal 371, respectively; thus, the output of the AND gate 503 becomes "1". On the other hand, each input to an AND gate 504 is "1" and "0", respectively, so that the output of the AND gate 504 becomes "0". Consequently, each reset terminal of the flip flops 351-364 becomes low level and each set terminal thereof becomes high level, and all the control signals of the loads become high level.

In addition, in case of the odd-number address, since the address least significant bit terminal 371 is "1", the output of the AND gate 503 becomes "0" and the output of the AND gate 504 becomes "1", so that each reset terminal of the flip flops 351-364 becomes high level and each set terminal thereof becomes low level. Thus, the load signals are cleared. With such an arrangement as described above, it is possible to connect loads which require low level signals as outputs of the I/O circuit 35 in the fail safe state as well as loads which require high level signals. The selection between "high"level and "low" level at the terminal 371 is determined by whether this terminal 371 is connected to the power supply side (+B) or to the ground side. This "high" or "low" level signal at the terminal 371 is also set forth in the previously-mentioned prior application.

Figure 6:
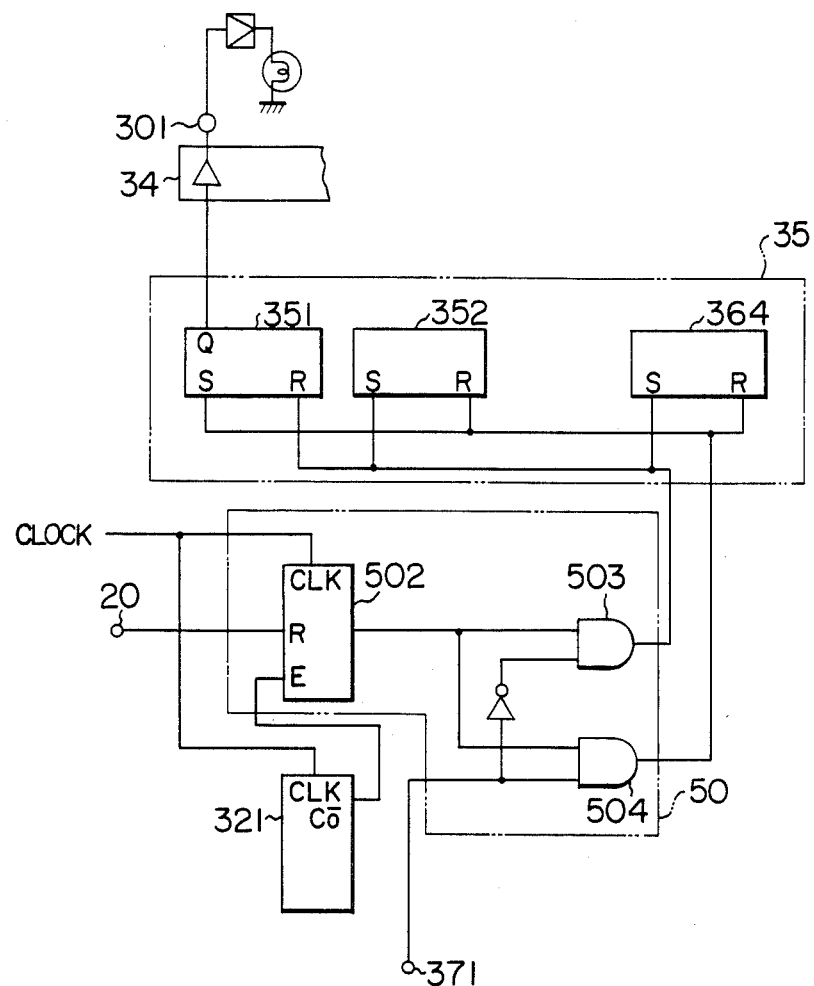

FIG. 6 is a circuit diagram showing still another embodiment of the fail safe circuit 50. The number of addresses assigned to the terminal processors is identical to the number of terminals which are used as the output terminals among the input-output terminals 301-314. At the input-output terminals (341 ---) which are used as the output terminals, the data delivered from the flip flops (351 ---) are the control signals of the load except for the case where the address is 0. Therefore, one bit of the flip flop 351 can be used as a fail safe flag. In FIG. 6, the setting of the fail safe flag is realized by reversely connecting the reset terminal and set terminal of the flip flop 351 and the reset terminals and set terminals of the remaining flip flops 352-364. This setting of such a fail safe flag enables the driver and repairman to recognize that the information transmission system is in the fail safe mode and to find out the abnormality of the multiple signal transmission line. The output Q of this flip flop 351 is output through the input-output gate 34 to the terminal 301. For example, this output then passes through an amplifier to light a lamp up.

Figure 7:
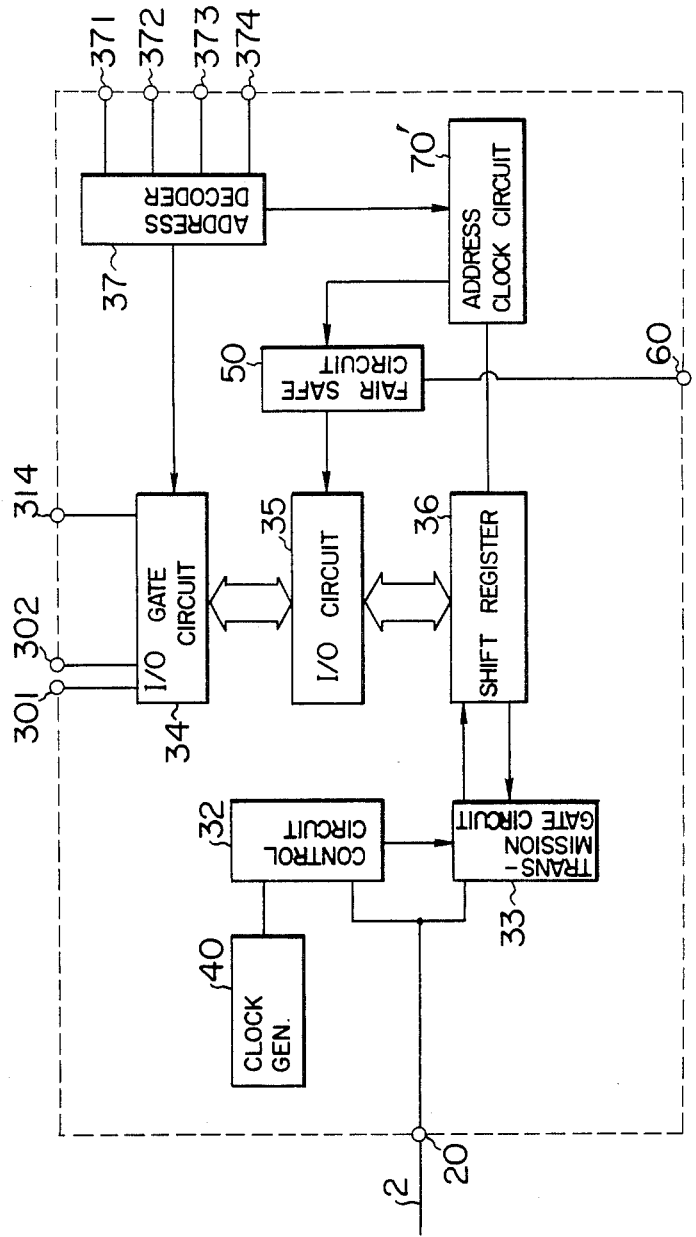
FIG. 7 is a circuit block diagram showing another embodiment of the terminal processor.
Figure 8:
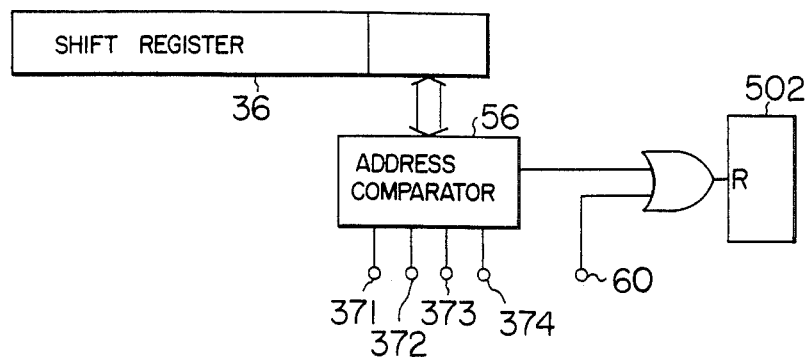
FIG. 8 is an explanatory diagram of an address check circuit of FIG. 7.

The above-described circuits shown in FIGS. 1-6 could not detect the failure in each terminal processor. On the other hand, FIG. 7 shows a circuit which can also detect the failure in each terminal processor. The same circuits having the same functions as those shown in FIG. 2 are designated by the same reference numerals. In FIG. 7, the signal to be transmitted from the CPU has the address information and is compared with the address assigned to the terminal processor by an address check circuit 70. The terminal processor is made operative only when they coincide with each other. The output signal of the address circuit 70 is used as a reset signal of the timer counter 502 (not shown) constituting the fail safe circuit 50. Since each terminal processor is accessed by the CPU within a constant time, the timer counter 502 is reset in the normal state and the transmission system does not enter the fail safe mode. Such a constitution as described can produce an effect such that the malfunction due to the noise can be eliminated since the reset signal of the timer counter is fetched from the logic in the terminal processor. Furthermore, since the timer counter operates after confirming that the data was received by each terminal processor, it is also possible to detect the failures of not only the transmission line but also each reception circuit. The fail safe circuit 50 of FIG. 7 has a circuit constitution similar to that of the circuit 50 of FIGS. 4 and 5. The address check circuit 70 corresponds to an address comparator 50 of the Japanese Patent Application No. 17535/82. It is constituted such that the timer counter 502 is reset by the coincidence output of this address comparator. That is to say, the address signal received by the constitution shown in FIG. 8 is retained as the head four bits of the shift register 36 and this address signal is compared with the output signals of the terminals 371-374 by an address comparator 56 and the timer 502 is reset only when they coincide with each other.

Figure 9:
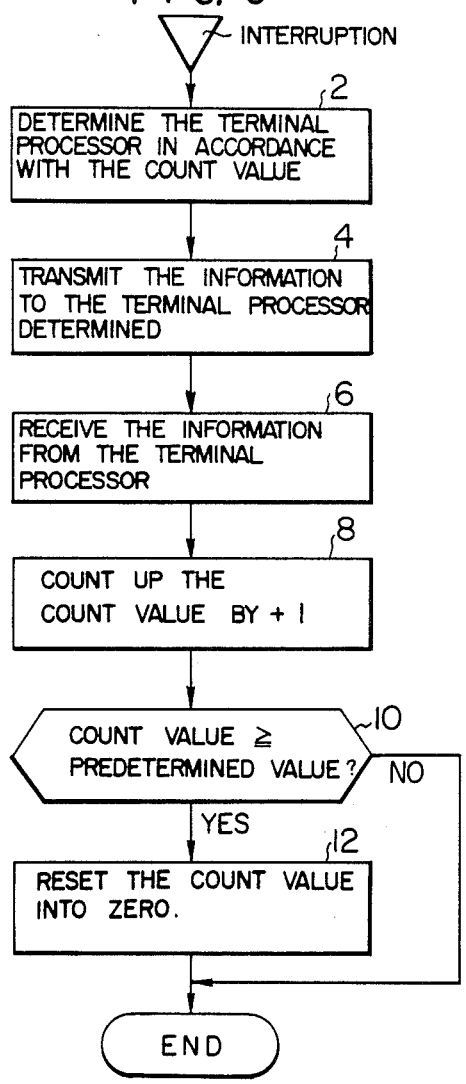
FIG. 9 is a diagram to explain the operations of a central processing unit.

A concrete circuit of the CPU 1 of FIG. 1 is described with respect to FIG. 7 of the Japanese Patent Application No. 17535/82. The fundamental operation of this CPU 1 will now be described with reference to FIG. 9. When an interruption request signal at every constant time is input to the CPU 1, the processing of step 2 is performed. Namely, the terminal processor on the reception side of the information transmission is determined in accordance with the count result which has already been counted. Then in step 4, the information is transmitted to the terminal processor determined in step 2. The information from the terminal processor responsive to the transmission is received in step 6. In step 8, the count value is increased by only +1 in response to this reception to transmit the next information. Due to this count-up, the next processor on the reception side of the information transmission is shifted by only one. In step 10, it is discriminated whether the transmission to all the terminal processors was finished or not. If YES in step 10, i.e., in the case where the transmission was finished, the count value is reset to zero to designate the first terminal processor. Next, when a given time period passes, the interruption signal is again generated and the processing of step 2 is executed.

In the embodiment of FIGS. 2–6, the time interval when the interruption signal is generated may be set to be shorter than the set time of the timer 502. However, in case of the embodiment of FIGS. 7 and 8, it is necessary to keep such time interval to be shorter than the value of which the set time of the timer 502 was divided by the number of terminal processors.

As described above, according to the present invention, there is an effect such that it is possible to promptly detect the abnormality of the signal transmission or the like. Furthermore, the execution of the backup operation in accordance with the detection result of abnormality enables malfunctions of loads to be prevented and provides an improvement in safety.

We claim:

1. Information transmitting system comprising:
   a transmitting apparatus for transmitting information;
   a receiving apparatus for receiving said transmission information;
   a transmission line provided between said transmitting apparatus and said receiving apparatus; and
   a load which operates in response to the output of said receiving apparatus;
   said transmitting apparatus including means for transmitting said information through the transmission line to said receiving apparatus in a predetermined time period and said receiving apparatus including means for allowing said load to operate on the basis of the transmission information received;
   whereby said receiving apparatus further includes means for detecting the reception interval of the transmission information from the transmission line, including pulse generator means for generating pulses at a given time period and timer means for counting said pulses and for returning the count value thereof to an initial value in response to the reception of said transmission information, and means for generating an abnormality signal when said timer means has reached a count value indicating that said interval is equal to or greater than a predetermined time.

2. An information transmitting system according to claim 1, wherein said receiving apparatus is provided with a first terminal and means for stopping the operation of said abnormality signal generator means in response to a signal from said first terminal.

3. An information transmitting system according to claim 2, wherein the count value of said timer means is returned to the initial value in response to the output of said first terminal.

4. An information transmitting system according to claim 2, wherein said receiving apparatus includes a first register and a gate circuit for transmitting the transmission information from the transmission line to said first register in the reception mode, and wherein said count value of said timer means is returned to the initial value in response to the output of said gate circuit.

5. An information transmitting system according to claim 2 or 3, wherein an address is assigned to said receiving apparatus and an address detection circuit is provided to detect the coincidence between an address information in the information received through said transmission line and the address assigned to the receiving apparatus, and wherein the count value of said timer means is returned to the initial value in response to the output of said address detection circuit.

6. An information transmitting system according to claim 1, wherein said receiving apparatus further includes output register means for controlling said load and means for setting a predetermined value into said output register means in response to said abnormality signal.

7. An information transmitting system according to claim 6, wherein said receiving apparatus has a second terminal and the predetermined value to be determined on the basis of the input from said second terminal is set into said output register means.

8. An information transmitting system according to claim 7, wherein the input from said second terminal is also used as address information.

* * * * *